US012583791B2

(12) United States Patent
Nozaki et al.

(10) Patent No.: US 12,583,791 B2
(45) Date of Patent: Mar. 24, 2026

(54) ROADBED MATERIAL PRODUCTION METHOD

(71) Applicants: TAIHEIYO CEMENT CORPORATION, Tokyo (JP); THE UNIVERSITY OF TOKYO, Tokyo (JP)

(72) Inventors: Takahito Nozaki, Tokyo (JP); Aoi Fukuoka, Tokyo (JP); Kouki Ichitsubo, Tokyo (JP); Takayuki Hayakawa, Tokyo (JP); Takafumi Noguchi, Tokyo (JP); Dianchao Wang, Tokyo (JP)

(73) Assignees: TAIHEIYO CEMENT CORPORATION, Tokyo (JP); THE UNIVERSITY OF TOKYO, Tokyo (JP)

( * ) Notice: Subject to any disclaimer, the term of this patent is extended or adjusted under 35 U.S.C. 154(b) by 305 days.

(21) Appl. No.: 18/263,157

(22) PCT Filed: Mar. 16, 2022

(86) PCT No.: PCT/JP2022/011846
§ 371 (c)(1),
(2) Date: Jul. 27, 2023

(87) PCT Pub. No.: WO2022/202522
PCT Pub. Date: Sep. 29, 2022

(65) Prior Publication Data
US 2024/0092693 A1      Mar. 21, 2024

(30) Foreign Application Priority Data

Mar. 23, 2021    (JP) ................................. 2021-048741

(51) Int. Cl.
| | |
|---|---|
| $C04B\ 20/02$ | (2006.01) |
| $C04B\ 18/167$ | (2023.01) |
| $E01C\ 3/00$ | (2006.01) |
| $C04B\ 111/00$ | (2006.01) |

(52) U.S. Cl.
CPC .......... $C04B\ 20/023$ (2013.01); $C04B\ 18/167$ (2013.01); $C04B\ 20/026$ (2013.01); $E01C\ 3/003$ (2013.01); $C04B\ 2111/00017$ (2013.01)

(58) Field of Classification Search
None
See application file for complete search history.

(56) References Cited

U.S. PATENT DOCUMENTS

| | | | | | |
|---|---|---|---|---|---|
| 5,997,629 | A | * | 12/1999 | Hills ................... | C09K 17/045 |
| | | | | | 588/256 |
| 2009/0283016 | A1 | * | 11/2009 | Mohamed ............... | C04B 2/106 |
| | | | | | 106/638 |
| 2011/0165400 | A1 | * | 7/2011 | Quaghebeur ....... | C04B 40/0231 |
| | | | | | 428/220 |

FOREIGN PATENT DOCUMENTS

| | | |
|---|---|---|
| JP | H05-238790 A | 9/1993 |
| JP | 2003-334532 A | 11/2003 |
| JP | 2008-127968 A | 6/2008 |
| JP | 2009-28581 A | 2/2009 |
| JP | 2010-221156 A | 10/2010 |
| JP | 2011-255269 A | 12/2011 |
| JP | 2017-70896 A | 4/2017 |
| KR | 10-0950099 B1 | 3/2010 |

OTHER PUBLICATIONS

International Search Report dated Jun. 7, 2022 issued in corresponding international patent application No. PCT/JP2022/011846 (and English translation).
Written Opinion of the International Searching Authority dated Jun. 7, 2022 issued in corresponding international patent application No. PCT/JP2022/011846 (and English translation).

* cited by examiner

*Primary Examiner* — Andrew Sue-Ako
(74) *Attorney, Agent, or Firm* — Posz Law Group, PLC

(57) ABSTRACT

Provided is a method of producing a roadbed material from which less hexavalent chromium leaches out through use of a crushed product of a cementitious hardened body containing hexavalent chromium as a raw material. The method includes a carbonation treatment step of subjecting the crushed product of the cementitious hardened body to carbonation treatment with a carbon dioxide-containing gas having a temperature of 50° C. to 140° C. and a water content of 1.5% or more to obtain the roadbed material from which less hexavalent chromium leaches out than before the treatment. Preferably, the method includes, before the carbonation treatment step, a crushing step of crushing the cementitious hardened body to obtain a crushed product consisting of grains having a grain size of 100 mm or less at a ratio of 50 mass % or more and a grain size of 2.36 mm or less at a ratio of 1 mass % or more.

8 Claims, No Drawings

ROADBED MATERIAL PRODUCTION METHOD

CROSS REFERENCE TO RELATED APPLICATIONS

This application is a U.S. national stage application of PCT/JP2022/011846 filed on Mar. 16, 2022, which claims priority from Japanese Patent Application No. 2021-048741 filed on Mar. 23, 2021, the contents of which are incorporated herein by reference.

TECHNICAL FIELD

The present invention relates to a method of producing a roadbed material.

BACKGROUND ART

It has hitherto been known that waste concrete or the like produced from demolition of a construction is reutilized as a roadbed material or an earthmoving material such as a backfill material.

Meanwhile, a cementitious hardened body (paste, mortar, or concrete) has a problem in that the leaching amount of hexavalent chromium is increased when the cementitious hardened body proceeds with neutralization.

In Patent Literature 1, as a method of suppressing the leaching of hexavalent chromium from industrial waste such as a concrete waste material, there is a description of a method of treating hexavalent chromium, including bringing industrial waste or industrial wastewater containing hexavalent chromium into contact with slag mainly including converter furnace decarburized slag to reduce hexavalent chromium in the industrial waste or the industrial wastewater.

In Patent Literature 2, as a method of producing, from a concrete waste material, a roadbed material or an earthmoving material in which the leaching of hexavalent chromium is suppressed, there is a description of a method of producing a roadbed material or the like from a concrete waste material, including, in a step of crushing a concrete waste material to provide a roadbed material and/or an earthmoving material, adding blast furnace air-cooled slag to the concrete waste material and crushing the concrete waste material together with the blast furnace air-cooled slag.

CITATION LIST

Patent Literature

[PTL 1] JP 2017-70896 A
[PTL 2] JP 2008-127968 A

SUMMARY OF INVENTION

Technical Problem

When a concrete waste material or the like is reutilized as a roadbed material, it is required that the leaching of hexavalent chromium contained in the concrete waste material (hereinafter sometimes referred to as "waste concrete") or the like be suppressed. The waste concrete or the like is liable to cause leaching of hexavalent chromium when the waste concrete or the like proceeds with neutralization, and hence it is required to take measures to suppress the leaching of hexavalent chromium by, for example, mixing a treatment material having a reducing action.

An object of the present invention is to provide a method of producing a roadbed material capable of simply producing a roadbed material from which less hexavalent chromium leaches out through use of a crushed product of a cementitious hardened body containing hexavalent chromium as a raw material.

Solution to Problem

The inventors of the present invention have made extensive investigations to achieve the above-mentioned object, and as a result, have found that the object can be achieved by a method of producing a roadbed material, including a step of subjecting a crushed product of a cementitious hardened body containing hexavalent chromium to carbonation treatment with a carbon dioxide-containing gas having a temperature of from 50° C. to 140° C. and a water content of 1.5% or more to obtain a roadbed material from which less hexavalent chromium leaches out than before the treatment. Thus, the present invention has been completed.

That is, the present invention provides the following items [1] to [4].

[1] A method of producing a roadbed material through use of a crushed product of a cementitious hardened body containing hexavalent chromium as a raw material, the method including a carbonation treatment step of subjecting the crushed product of the cementitious hardened body to carbonation treatment with a carbon dioxide-containing gas having a temperature of from 50° C. to 140° C. and a water content of 1.5% or more to obtain the roadbed material from which less hexavalent chromium leaches out than before the treatment.

[2] The method of producing a roadbed material according to the above-mentioned item [1], further including, before the carbonation treatment step, a crushing step of crushing the cementitious hardened body containing hexavalent chromium to obtain a crushed product consisting of grains having a grain size of 100 mm or less at a ratio of 50 mass % or more and having a grain size of 2.36 mm or less at a ratio of 1 mass % or more.

[3] The method of producing a roadbed material according to the above-mentioned item [2], further including, between the crushing step and the carbonation treatment step, a classification step of classifying the crushed product obtained in the crushing step to obtain a crushed product consisting of grains having a grain size of 100 mm or less at a ratio of 80 mass % or more and having a grain size of 2.36 mm or less at a ratio of 5 mass % or more.

[4] The method of producing a roadbed material according to any one of the above-mentioned items [1] to [3], wherein the cementitious hardened body is a waste material made of concrete or a waste material made of mortar.

Advantageous Effects of Invention

According to the present invention, the roadbed material from which less hexavalent chromium leaches out can be simply produced through use of the crushed product of the cementitious hardened body containing hexavalent chromium as a raw material.

The roadbed material itself can be reduced in hexavalent chromium leaching property, and hence there is no need to take measures to suppress the leaching of hexavalent chromium by, for example, mixing a treatment material having a reducing action at the time of use of the roadbed material.

The elimination of the need to use the treatment material having a reducing action also prevents, for example, a problem in that the treatment material having a reducing action flows out by being brought into contact with water or the like after use of the roadbed material.

DESCRIPTION OF EMBODIMENTS

A method of producing a roadbed material of the present invention is a method of producing a roadbed material through use of a crushed product of a cementitious hardened body containing hexavalent chromium as a raw material, the method including a carbonation treatment step of subjecting the crushed product of the cementitious hardened body to carbonation treatment with a carbon dioxide-containing gas having a temperature of from 50° C. to 140° C. and a water content of 1.5% or more to obtain a roadbed material from which less hexavalent chromium leaches out than before the treatment. The present invention is described in detail below.

The "cementitious hardened body" as used herein means a body obtained by hardening a composition containing cement and water. Specifically, the "cementitious hardened body" means any of a hardened body including concrete, a hardened body including mortar, and a hardened body including cement paste.

The term "cementitious hardened body" as used herein encompasses not only a completely-hardened hardened body but also a semi-hardened hardened body (in other words, one that is being hardened, e.g., concrete sludge).

A waste material including a cementitious hardened body is preferably used as the cementitious hardened body from the viewpoints that the roadbed material from which less hexavalent chromium leaches out can be produced even from a cementitious hardened body which proceeds with neutralization and is liable to cause leaching of hexavalent chromium, and that utilization of waste can be promoted.

Examples of the waste material including a cementitious hardened body include recycled aggregate, a waste material including concrete or mortar, a waste material including cement paste, and sludge generated from ready-mixed concrete (completely hardened one, or sludge in a semi-hardened state after dehydration treatment).

Of those, a waste material including concrete or a waste material including mortar is preferred from the viewpoints of easy availability and the like.

[Carbonation Treatment Step]

This step is a step of subjecting a crushed product of a cementitious hardened body containing hexavalent chromium to carbonation treatment with a carbon dioxide-containing gas having a temperature of from 50° C. to 140° C. and a water content of 1.5% or more to obtain a roadbed material from which less hexavalent chromium leaches out than before the treatment.

The "carbon dioxide-containing gas" as used herein means a gas containing a carbon dioxide gas ($CO_2$ as a gas).

An example of the carbon dioxide-containing gas is an exhaust gas from a plant.

Examples of the exhaust gas from a plant include an exhaust gas from a cement plant, an exhaust gas from a coal-fired power plant, and an exhaust gas generated through exhaust treatment in a paint plant.

A highly purified gas separated and collected from an exhaust gas from a plant may also be used as the exhaust gas from a plant.

In a carbonation treatment step, the carbon dioxide gas is fixed to the crushed product of the cementitious hardened body, and hence when the exhaust gas from a plant is used as the carbon dioxide-containing gas, carbon dioxide in the exhaust gas can be fixed to the cementitious hardened body, to thereby reduce the emissions of carbon dioxide to the atmosphere.

The ratio of the carbon dioxide gas in the carbon dioxide-containing gas in terms of a volume fraction value is preferably 5% or more, more preferably 10% or more, still more preferably 20% or more, still more preferably 40% or more, still more preferably 50% or more, particularly preferably 60% or more. When the above-mentioned ratio is 5% or more, the amount of carbon dioxide to be fixed to the roadbed material is increased more, and the hexavalent chromium leaching property of the roadbed material can be reduced more in a shorter period of time. In addition, the emissions of carbon dioxide to the atmosphere can be reduced more.

In the present invention, the carbon dioxide-containing gas satisfies the condition of having a temperature of from 50° C. to 140° C.

The above-mentioned temperature is from 50° C. to 140° C., preferably from 55° C. to 130° C., more preferably from 65° C. to 125° C., still more preferably from 75° C. to 110° C., still more preferably from 80° C. to 100° C., particularly preferably from 85° C. to 95° C.

When the above-mentioned temperature is outside the range of from 50° C. to 140° C., the amount of the carbon dioxide gas (carbon dioxide) to be fixed is reduced.

When the temperature of the carbon dioxide-containing gas (e.g., an exhaust gas from a plant) assumed as an application target of the method of the present invention is less than 50° C. or more than 140° C., the carbon dioxide-containing gas may be heated or cooled to control the temperature of the gas to a desired value within the range of from 50° C. to 140° C.

In the present invention, the carbon dioxide-containing gas satisfies the condition of having a water content of 1.5% or more.

The "water content" means the ratio of water vapor in the carbon dioxide-containing gas in terms of a volume fraction (unit: %).

The water content is 1.5% or more, preferably 2% or more, more preferably 3% or more, still more preferably 4% or more, particularly preferably 4.5% or more. When the water content is less than 1.5%, the amount of the carbon dioxide gas (carbon dioxide) to be fixed is reduced. That is, even in the case where a carbon dioxide-containing gas having the same ratio (volume fraction) of the carbon dioxide gas is used in the same amount, when the carbon dioxide-containing gas has a water content of 1.5% or more, the amount of carbon dioxide to be fixed is increased, and the hexavalent chromium leaching property of the roadbed material can be reduced more in a shorter period of time. In addition, the emissions of carbon dioxide to the atmosphere can be reduced more.

The water content may be set to be higher than the above-mentioned preferred numerical range when only an increase in amount of carbon dioxide to be fixed is considered without consideration of an increase in load of water supply.

In this case, the water content is preferably 10% or more, more preferably 15% or more, still more preferably 20% or more, particularly preferably 25% or more. When the water content is increased as described above, the fixation of the carbon dioxide gas (carbon dioxide) can be performed in a more efficient manner and in a larger amount.

The upper limit value of the water content is not particularly limited, but is preferably 70%, more preferably 60%, particularly preferably 50% because as the water content is increased more, the load of water supply (particularly, the need for an improvement in performance of water supply equipment or for a large amount of water) is increased more.

When the water content of the carbon dioxide-containing gas (e.g., an exhaust gas from a plant) assumed as an application target of the method of the present invention is less than 1.5%, water may be supplied to the carbon dioxide-containing gas to control the water content of the gas to a desired value of 1.5% or more.

The water content may be measured by a method described in "7 Measurement of Water Content in Flue Gas" of "JIS Z 8808:2013 Methods of Measuring Dust Concentration in Flue Gas."

One preferred exemplary embodiment of the carbon dioxide-containing gas to be used in the present invention is a gas including water vapor, a carbon dioxide gas (carbon dioxide), and an inert gas.

Examples of the inert gas include a nitrogen gas and an argon gas.

The ratio of the inert gas in the carbon dioxide-containing gas in terms of a volume fraction value is preferably 10% or more, more preferably 20% or more, still more preferably 30% or more, particularly preferably 35% or more. The case in which the ratio is 10% or more is preferred because, for example, such carbon dioxide-containing gas is easily available.

Examples of the other components (components other than the water vapor, the carbon dioxide gas, and the inert gas) of the carbon dioxide-containing gas to be used in the present invention include carbon monoxide, hydrocarbons, nitrogen oxides, and sulfur oxides. Those examples of the other components are generally included in an exhaust gas from a plant or the like.

The ratio of the other components in the carbon dioxide-containing gas in terms of a volume fraction value is preferably 30% or less, more preferably 20% or less, still more preferably 10% or less, particularly preferably 5% or less. The case in which the ratio is 30% or less is preferred because, for example, such carbon dioxide-containing gas is easily available.

The carbonation treatment is performed by bringing the above-mentioned carbon dioxide-containing gas into contact with the crushed product of the cementitious hardened body containing hexavalent chromium.

In the present invention, the period of time for which the carbon dioxide-containing gas is brought into contact with the crushed product is preferably 5 minutes or more, more preferably 10 minutes or more, still more preferably 20 minutes or more, still more preferably 30 minutes or more, particularly preferably 40 minutes or more from the viewpoint of increasing the amount of carbon dioxide to be fixed.

The upper limit value of the above-mentioned period of time is preferably 48 hours, more preferably 36 hours, still more preferably 24 hours, still more preferably 12 hours, still more preferably 6 hours, particularly preferably 3 hours from the viewpoint that, when the period of time is too long, the efficiency of the carbonation treatment is reduced, and the amount of carbon dioxide to be fixed stops increasing.

The conditions (temperature, period of time, and the like) of the carbonation treatment may be appropriately adjusted depending on the state of implementation of the carbonation treatment. For example, from the viewpoint of further improving the efficiency of the carbonation treatment, the carbonation treatment is preferably performed at a temperature of from 75° C. to 130° C. (preferably from 80° C. to 125° C.) for from 30 minutes to 3 hours (preferably from 40 minutes to 2 hours).

From the viewpoints of reducing cost required for heating and further increasing the amount of carbon dioxide to be fixed, the carbonation treatment is preferably performed at a temperature of 50° C. or more and less than 75° C. (preferably from 55° C. to 70° C.) for from 12 hours to 36 hours (preferably from 20 hours to 30 hours).

A crushing step of crushing the cementitious hardened body containing hexavalent chromium to obtain a crushed product including a product having a grain size of 100 mm or less at a ratio of 50 mass % or more and a product having a grain size of 2.36 mm or less at a ratio of 1 mass % or more may be performed before the carbonation treatment step.

When the crushing step is performed before the carbonation treatment step, the efficiency of the carbonation treatment can be further improved. In addition, the roadbed material to be obtained in the carbonation treatment step can achieve a desired grain size distribution.

The "grain size" as used herein means a size corresponding to dimensions of an opening of a sieve. For example, the "grain size of 100 mm or less" means that the product passes through a sieve having an opening of 100 mm.

Crushing means for the cementitious hardened body is not particularly limited as long as a cementitious hardened body having a desired grain size can be obtained, and examples thereof include a jaw crusher and a roll crusher.

The crushed product obtained by crushing the cementitious hardened body is preferably a crushed product including a product having a grain size of 100 mm or less at a ratio of 50 mass % or more (preferably 60 mass % or more, more preferably 70 mass % or more) in consideration of a general grain size distribution of the roadbed material, while the preferred crushed product varies depending on a preferred grain size of the target roadbed material.

In addition, from the viewpoint of further reducing the hexavalent chromium leaching property of the roadbed material, the crushed product obtained by crushing the cementitious hardened body is preferably a crushed product including a product having a grain size of 2.36 mm or less at a ratio of 1 mass % or more, preferably 5 mass % or more, more preferably 10 mass % or more, particularly preferably 20 mass % or more.

From the viewpoint of obtaining a roadbed material having a desired grain size distribution, a classification step of classifying the crushed product obtained in the crushing step to obtain a crushed product having a desired grain size distribution (e.g., a crushed product including a product having a grain size of 100 mm or less at a ratio of 80 mass % or more and a product having a grain size of 2.36 mm or less at a ratio of 5 mass % or more) may be performed between the crushing step and the carbonation treatment step.

The crushed product after the classification is preferably a crushed product including a product having a grain size of 100 mm or less at a ratio of 80 mass % or more (preferably 90 mass % or more, more preferably 100 mass %) in consideration of a general grain size distribution of the roadbed material, while the preferred crushed product varies depending on a preferred grain size of the target roadbed material.

From the viewpoint of further reducing the hexavalent chromium leaching property of the roadbed material, the crushed product after the classification is preferably a crushed product including a product having a grain size of 2.36 mm or less at a ratio of preferably 5 mass % or more, more preferably 10 mass % or more, still more preferably 20 mass % or more, particularly preferably 30 mass % or more.

The crushed product not having passed through a sieve at the time of classification may be subjected to the crushing step again.

EXAMPLES

Now, the present invention is specifically described by way of Examples. However, the present invention is not limited to these Examples.

Example 1

A crushed product having a grain size of from 0.6 mm to 1.18 mm was obtained by classifying commercially available recycled crushed stone (RC-40: recycled crushed stone having a grain size of 40 mm or less obtained by crushing waste concrete).

The crushed product was subjected to carbonation treatment by being brought into contact with a carbon dioxide-containing gas having a ratio of a carbon dioxide gas of 71.4%, a water content of 28.6%, and a temperature of 120° C. for 1 hour.

The water content was measured in conformity with a method described in "7 Measurement of Water Content in Flue Gas" of "JIS Z 8808:2013 Methods of Measuring Dust Concentration in Flue Gas."

[Measurement of Ratio of Calcium Carbonate]

For the crushed product after the carbonation treatment, the amounts of mass loss of the crushed product through heating at the respective temperatures of 500° C. and 800° C. with an electric furnace are determined, and a value obtained by subtracting the amount of mass loss at 500° C. from the amount of mass loss at 800° C. is determined as the amount of mass loss from 500° C. to 800° C. The ratio of calcium carbonate was calculated from the amount of mass loss.

The mass loss from 500° C. to 800° C. indicates that calcium carbonate contained in the crushed product is decarbonated (in other words, $CaCO_3$ is converted to CaO). That is, the amount of calcium carbonate ($CaCO_3$) before decarbonation may be calculated based on the degree of mass loss (amount of $CO_2$).

[Measurement of Leaching Amount of Hexavalent Chromium]

The leaching amount of hexavalent chromium from the crushed product after the carbonation treatment was measured by a leaching test method in conformity with "Hexavalent Chromium" in the attached table of Environment Agency Notification No. 46 "Environmental Quality Standards for Soil Pollution" announced on Aug. 23, 1991. In addition, the pH of a leaching test solution obtained by the leaching test method was measured.

Example 2

The crushed product was subjected to the carbonation treatment in the same manner as in Example 1 except that the temperature of the carbon dioxide-containing gas was changed from 120° C. to 90° C.

Example 3

The crushed product was subjected to the carbonation treatment in the same manner as in Example 1 except that the ratio of the carbon dioxide gas, the water content, and the temperature of the carbon dioxide-containing gas were changed from 71.4% to 80%, from 28.6% to 18.7%, and from 120° C. to 60° C., respectively.

Comparative Example 1

The crushed product was subjected to the carbonation treatment in the same manner as in Example 1 except that the ratio of the carbon dioxide gas, the water content, and the temperature of the carbon dioxide-containing gas were changed from 71.4% to 5±0.2%, from 28.6% to 1.4%, and from 120° C. to 20±2° C., respectively.

Comparative Example 2

The crushed product was subjected to the carbonation treatment in the same manner as in Comparative Example 1 except that the period of contact time with the carbon dioxide-containing gas was changed from 24 hours to 48 hours.

Comparative Example 3

The crushed product was subjected to the carbonation treatment in the same manner as in Comparative Example 1 except that the period of contact time with the carbon dioxide-containing gas was changed from 24 hours to 72 hours.

The crushed products after the carbonation treatment obtained in Examples 2 and 3 and Comparative Examples 1 to 3 were each measured for the ratio of calcium carbonate and the leaching amount of hexavalent chromium in the same manner as in Example 1. The results are shown in Table 1.

TABLE 1

| | Carbon dioxide gas (%) | Water content (%) | Temperature (° C.) | Time (hr) | $CaCO_3$ (mass %) | Leaching amount of hexavalent chromium (mg/liter) | pH |
|---|---|---|---|---|---|---|---|
| Example 1 | 71.4 | 28.6 | 120 | 1 | 10.0 | 0.032 | 10.2 |
| Example 2 | 71.4 | 28.6 | 90 | 1 | 10.8 | 0.034 | 9.8 |
| Example 3 | 80.0 | 18.7 | 60 | 24 | 15.3 | 0.028 | 8.9 |
| Comparative Example 1 | 5 ± 0.2 | 1.4 | 20 ± 2 | 24 | 8.1 | 0.045 | 10.5 |
| Comparative Example 2 | 5 ± 0.2 | 1.4 | 20 ± 2 | 48 | 9.7 | 0.049 | 10.2 |
| Comparative Example 3 | 5 ± 0.2 | 1.4 | 20 ± 2 | 72 | 10.7 | 0.055 | 9.9 |

It is found from Table 1 that the leaching amount of hexavalent chromium in each of Examples 1 to 3 (from 0.028 mg/liter to 0.034 mg/liter) is smaller than the leaching amount of hexavalent chromium in each of Comparative Examples 1 to 3 (from 0.045 mg/liter to 0.055 mg/liter), and the roadbed material of each of Examples 1 to 3 causes leaching of less hexavalent chromium than the roadbed material of each of Comparative Examples 1 to 3.

It is found that the ratio of calcium carbonate in each of Examples 1 to 3 (from 10.0% to 15.3%) is bigger than the ratio of calcium carbonate in each of Comparative Examples 1 and 2 (from 8.1% to 9.7%), and a larger amount of carbon dioxide is fixed in a short period of time.

The invention claimed is:

1. A method of producing a roadbed material through use of a crushed product of a cementitious hardened body containing hexavalent chromium as a raw material, the method comprising a carbonation treatment step of subjecting the crushed product of the cementitious hardened body to carbonation treatment with a carbon dioxide-containing gas having a temperature of from 50° C. to 140° C. and a water content of 1.5% or more to obtain the roadbed material from which less hexavalent chromium leaches out than before the treatment.

2. The method of producing a roadbed material according to claim 1, further comprising, before the carbonation treatment step, a crushing step of crushing the cementitious hardened body containing hexavalent chromium to obtain the crushed product, wherein the crushed product consists of grains having a grain size of 100 mm or less at a ratio of 50 mass % or more and having a grain size of 2.36 mm or less at a ratio of 1 mass % or more.

3. The method of producing a roadbed material according to claim 1, wherein the cementitious hardened body is a waste material made of concrete or a waste material made of mortar.

4. The method of producing a roadbed material according to claim 1, further comprising, before the carbonation treatment step, a crushing step of crushing the cementitious hardened body containing hexavalent chromium to obtain a crushed product consisting of grains having a grain size of 100 mm or less at a ratio of 50 mass % or more and having a grain size of 2.36 mm or less at a ratio of 1 mass % or more.

5. The method of producing a roadbed material according to claim 4, further comprising, between the crushing step and the carbonation treatment step, a classification step of classifying the crushed product obtained in the crushing step to obtain the crushed product, which is for being subjected to the carbonation treatment step, consisting of grains having a grain size of 100 mm or less at a ratio of 80 mass % or more and having a grain size of 2.36 mm or less at a ratio of 5 mass % or more.

6. The method of producing a roadbed material according to claim 1, the crushed product, which is for being subjected to the carbonation treatment step, consists of grains having a grain size of 100 mm or less at a ratio of 80 mass % or more and having a grain size of 2.36 mm or less at a ratio of 30 mass % or more.

7. The method of producing a roadbed material according to claim 1, a period of time for which the carbon dioxide-containing gas is brought into contact with the crushed product in the carbonation treatment step is 5 minutes or more.

8. The method of producing a roadbed material according to claim 1, a ratio of a carbon dioxide gas in the carbon dioxide-containing gas in terms of a volume fraction value is 5% or more.

* * * * *